United States Patent Office 3,337,563
Patented Aug. 22, 1967

3,337,563
2-AMINO-2,3-DIHYDRO-3-SUBSTITUTED-NAPHTHO[1,2-b]FURAN-5-OLS
Louis L. Skaletzky, Kalamazoo, Mich., assignor to The Upjohn Company, Kalamazoo, Mich., a corporation of Delaware
No Drawing. Filed Sept. 4, 1964, Ser. No. 394,606
5 Claims. (Cl. 260—294.7)

This invention pertains to novel organic chemical compounds, and to a process for preparing the same. More particularly, the invention is directed to novel 2-amino-2,3-dihydro-3-substituted-naphtho[1,2-b]furan-5-ols, and a process which comprises condensing a (1-alkenyl)amine and 1,4-naphthoquinone to produce the novel 2-amino-2,3-dihydro-3-substituted-naphtho[1,2-b]furan-5-ols.

The novel 2-amino-2,3-dihydro-3-substituted-naphtho[1,2-b]furan-5-ols of this invention have, in their free base form, the structural formula:

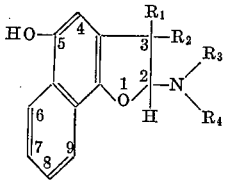

I wherein $R_1$ is selected from the group consisting of hydrogen, lower-alkyl, and phenyl; $R_2$ is selected from the group consisting of lower-alkyl and phenyl; $R_3$ and $R_4$ taken separately are selected from the group consisting of lower-alkyl, phenyl, and substituted phenyl selected from the group consisting of lower-alkylphenyl, lower-alkoxyphenyl, and halophenyl, provided that $R_3$ and $R_4$ are not simultaneously selected from phenyl and substituted phenyl; and $R_3$ and $R_4$ taken together with —N< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene.

The novel free base compounds of Formula I can be reacted with acids to form novel acid addition salts. The thus-formed acid addition salts are useful compounds in accordance with the invention and are, therefore, contemplated as an embodiment of the invention.

The hydroxyl group of the novel compounds of Formula I can be acylated to form novel esters. The thus-formed esters are useful compounds in accordance with the invention, and are also contemplated as an embodiment thereof. The free base esters of the invention can be represented by the structural formula:

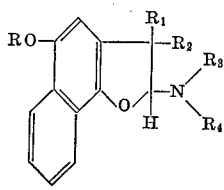

II wherein $R_1$, $R_2$, $R_3$, and $R_4$ are as defined above and R is lower-alkanoyl. The esters of Formula II also form acid addition salts according to the invention.

As employed herein, the term "lower-alkanoyl" means the acyl group of any alkanoic acid of from 1 to 6 carbon atoms, inclusive, for example, formyl, acetyl, propionyl, butyryl, valeryl, caproyl, and the isomeric forms thereof. The term "lower-alkyl" includes methyl, ethyl, propyl, butyl, pentyl, hexyl, and the isomeric forms thereof. The term "lower-alkoxy" includes methoxy, ethoxy, propoxy, butoxy, and the isomeric forms thereof. The term "halophenyl" includes, for example, o-fluorophenyl, p-bromophenyl, 3,5-dichlorophenyl, 3,4,5-tribromophenyl, m-iodophenyl, o-chlorophenyl, and the like. And finally, the term "saturated heterocyclic amino radical

of from 5 to 7 nuclear atoms, inclusive," includes, for example, pyrrolidinyl, 2-methylpyrrolidinyl, 2-ethylpyrrolidinyl, 2,2-dimethylpyrrolidinyl, 3,4-dimethylpyrrolidinyl, 2-isopropylpyrrolidinyl, 2-sec.butylpyrrolidinyl, and like alkylpyrrolidinyl groups, morpholino, 2-ethylmorpholino, 2-ethyl-5-methylmorpholino, 3,3-dimethylmorpholino, thiamorpholino, 3-methylmorpholino, 2,3,6-trimethylmorpholino, 4-methylpiperazinyl, 4 - butylpiperazinyl, piperidino, 2 - methylpiperidino, 3 - methylpiperidino, 4-methylpiperidino, 4-propylpiperidino, 2-propylpiperidino, 4-isopropylpiperidino, and like alkylpiperidino groups, hexamethylenimino, 2-methylhexamethylenimino, 3,6-dimethylhexamethylenimino, homomorpholino, and the like.

The novel compounds of this invention are useful for a variety of purposes. For example, the free base compounds of Formulas I and II can be reacted with fluosilicic acid to form amine fluosilicate salts in accordance with U.S. Patents 1,915,334 and 2,075,359. The amine fluosilicate salts thus obtained are effective as moth-proofing agents. The same free base compounds also form salts with thiocyanic acid, which salts can be condensed with formaldehyde in accordance with U.S. Patents 2,425,320 and 2,606,155 to form amine thiocyanate-formaldehyde condensation products for use as pickling inhibitors.

The compounds of Formula I are otherwise useful as intermediates for reaction with phosgene to produce the corresponding chloroformates which in turn are reacted with ammonia, monomethylamine, dimethylamine, or other primary or secondary amines to produce corresponding carbamates useful as insecticides. Insecticidal carbamates can also be prepared by reacting the compounds of Formula I with isocyanates such as methyl isocyanate, ethyl isocyanate, and the like.

In accordance with a preferred embodiment of the invention the compounds of Formulas I and II wherein $R_3$ and $R_4$ taken together with —N< constitute a saturated heterocyclic amino radical

(as defined above) have been found to be pharmacologically effective as inhibitors of pseudocholinesterase, and they can be used as central nervous stimulants in mammals, birds, and other animals. More particularly, the heterocyclic amino compounds of Formulas I and II and their pharmacologically acceptable acid addition salts are useful for alleviating mental depression. The heterocyclic amino compounds of Formulas I and II and their acid addition salts are useful fungicides. Illustratively, the compounds are active againt *Candida albicans, Microsporum canis, Trichlophyton rubrum,* and *Fusarium oxysporum* var. *cubense*. The compounds are also active against neoplastic tissues, for example, Sarcoma 180 in rats.

The novel 2-amino-2,3-dihydro-3-substituted-naphtho[1,2-b]furan-5-ols of this invention (compounds of Formula I) are prepared by condensing a (1-alkenyl)amine of the formula:

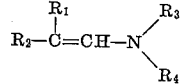

III wherein $R_1$, $R_2$, $R_3$, and $R_4$ are as defined above and 1,4- naphthoquinone, advantageously in the presence of an inert solvent and under substantially anhydrous conditions. It is preferred to employ about equimolar amounts of the reactants, although an excess of the (1-alkenyl) amine can be employed if desired. The condensation reaction is exothermic, and the reaction mixture undergoes an initial evolution of heat. In some circumstances, depending somewhat on quantities and concentration of reactants and rate of mixing, the temperature of the reaction mixture will reach the boiling temperature. After the initial reaction subsides, the reaction is completed at about 25° C.; although it can also be completed at temperatures higher than 25° C. if desired, such as up to about 80° C. or even higher. Ordinarily, satisfactory yields are obtained after about 15 hrs. to about 48 hrs. at about 25° C.; but if desired, longer reaction times can be employed. Since the reaction is sometimes vigorously exothermic, it may be desirable to mix the reactants at a temperature in the range about 4° to about 10° C. and then permit the reaction mixture to warm to about 25° C. for completion of the reaction. Suitable inert solvents for the reaction include benzene, ethyl acetate, toluene, hexane, ether, tetrahydrofuran, dioxane, chloroform, carbon tetrachloride, acetonitrile, and the like.

The 2-amino-2,3-dihydro-3-substituted-naphtho[1,2-b] furan-5-ols usually separate from the reaction mixture or can be separated by conventional methods and are thus recovered. The product can be further purified, for example, by washing, and recrystallization from suitable solvents.

The esters of Formula II are prepared from the 2 - amino - 2,3 - dihydro - 3 - substituted-naphtho[1,2-b] furan-5-ols of Formula I by treatment with an alkanoic anhydride, e.g., acetic anhydride, acetic formic anhydride, propionic anhydride, butyric anhydride, isobutyric anhydride, valeric anhydride, caproic anhydride, and the like.

The acid addition salts of this invention are obtained by neutralizing the free base compounds of Formulas I and II with an acid by conventional methods. For example, the compounds can be treated with at least a stoichiometric amount of the appropriate acid; and depending upon the nature of the solvent employed, the desired salt will separate spontaneously or can be precipitated by the addition of a solvent in which the salt is insoluble. Acid addition salts can also be prepared metathetically by reacting an acid addition salt of this invention with an acid which is stronger than the acid comprising the acid moiety of the starting salt. Pharmacologically acceptable acid addition salts can be prepared using acids such as sulfuric, hydrochloric, hydrobromic, nitric, phosphoric, benzoic, p-toluenesulfonic, salicyclic, acetic, propionic, pamoic, tartaric, citric, succinic acids, and the like. Similarly, acid addition salts can be prepared with acids such as fluosilicic acid, thiocyanic acid, and the like. All of the acid addition salts according to this invention are useful for refining the free bases.

The (1-alkenyl)amine starting compounds of Formula III (many of which are known) are readily prepared by known methods for reacting an aldehyde

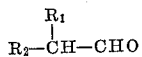

wherein $R_1$ and $R_2$ are as defined above and a secondary amine

wherein $R_3$ and $R_4$ are as defined above. The reaction of the aldehyde and the secondary amine can be effected according to the general method described by Mannich and Davidsen, Ber. 69, 2106 (1936) or the modified Mannich and Davidsen method described by Brannock and Burpitt, J. Org. Chem., 26, 3576 (1961). Another general method particularly adapted to high-boiling secondary amines was described by Stork et al., J. Am. Chem. Soc., 85, 207–222 (1963).

According to the Mannich and Davidsen method one mole of aldehyde and about 2 moles of secondary amine are reacted at about 0° C. in the presence of potassium carbonate and an inert organic solvent. The resulting 1,1-diamine is converted to the desired (1-alkenyl)amine by heating at the reflux temperature, and the (1-alkenyl) amine is recovered by distillation or other conventional methods.

Brannock and Burpitt modified the foregoing method by reacting the aldehyde and the secondary amine in an autoclave. They used about 1.1 moles of potassium carbonate, 500 ml. of xylene, 4 moles of aldehyde, and 4.4 moles of secondary amine and heated the reaction mixture in an autoclave at 100° C. for 4 hrs. As soon as the reaction mixture was cool, the liquid portion was decanted and distilled to obtain the (1-alkenyl)amine. They caution that lesser proportions of potassium carbonate or solvent, and permitting the reaction mixture to stand, will reduce yields. The foregoing procedures are efficacious even with low-boiling amines such as dimethylamine and diethylamine.

The Stork et al. method is particularly adapted for high-boiling amines such as diisopropylamine, diisobutylamine, N-methylaniline, N-butylaniline, N-isoamylaniline, and the like. According to their method, the aldehyde and secondary amine are heated in the presence of benzene or toluene, and about 1.5 to 2.0 molar equivalents of amine is used per molar equivalent of aldehyde. In some instances p-toluenesulfonic acid is used as a catalyst. The reaction mixture is ordinarily heated at the reflux temperature using a water separator for from about 5 to about 24 hours or until water separation ceases. The (1-alkenyl)amine product is recovered from the reaction mixture by distillation under reduced pressure.

As noted, many of the (1-alkenyl)amine starting compounds required for preparing the novel 2-amino-2,3-dihydro-3-substituted-naphtho[1,2-b]furan-5-ols of this invention (compounds according to Formula I) are known in the art. Illustratively, Mannich and Davidsen prepared 1 - propenylpiperidine, 1 - (1-heptenyl)piperidine, 1 - (2-methylpropenyl)piperidine, 1-(1-butenyl)piperidine, N,N-diethyl - 1 - heptenylamine, N-1-butenyl-N-methylaniline, N,N-diethylstyrylamine, and 1-styrylpiperidine. Further illustratively, Opitz et al., Ann. 623, 112–117 (1959) prepared 1-propenylpyrrolidine, 1-(3-methyl-1-butenyl)piperidine, N,N-diethyl-1-butenylamine, 1-(2-ethyl-1-butenyl) piperidine, N,N-diethyl - 2 - methylpropenylamine, 4-(1-heptenyl)morpholine, 1 - (2-methylpropenyl)pyrrolidine, and 1-(2-ethyl-1-hexenyl)piperidine. Enamines tend to be unstable, particularly in the presence of water. It is good practice, therefore, to store them in the cold under nitrogen unless they are to be used soon after they are prepared.

According to the foregoing described methods other (1-alkenyl)amines according to Formula III can be prepared by employing aldehydes such as 2-ethyloctaldehyde, 2,3 - dimethylbutyraldehyde, 2 - methylheptaldehyde, 2-butyloctaldehyde, 2 - butylhexaldehyde, 2 - hexyloctaldehyde, diphenylacetaldehyde, 2-phenylpropionaldehyde, 3-methyl - 2 - phenylbutyraldehyde, 2 - phenyloctaldehyde and like aldehydes; and secondary amines such as dimethylamine, diisopropylamine, diisobutylamine, dihexylamine, p - isopropyl-N-tert.pentylaniline, N-butyl-o-chloroaniline, N - methyl-m-toluidine, N-ethyl - 3,5 - xylidine, N,3-dimethylbutylamine, thiamorpholine, N-isopropylhexylamine, N-isopropyl-p-anisidine, N-ethylaniline, N-hexylaniline, N-ethyl-2-methylpropylamine, and like secondary amines.

PREPARATION 1

*Preparation of 4-(2-methylpropenyl)morpholine*

A solution of 52.0 g. (0.6 mole) of morpholine and 36.0 g. (0.5 mole) of isobutyraldehyde in 150 ml. of benzene was heated at the reflux temperature for 3 hours, using a Dean-Stark water separator, during which time 9.0 ml. of water was collected. The benzene was evaporated under reduced pressure and the residue was distilled to obtain 58.5 g. (83% yield) of 4-(2-methylpropenyl)morpholine as a colorless oil boiling at 60° to 63° C. (14–15 mm.).

PREPARATION 2

Following the procedure of Preparation 1, but replacing isobutyraldehyde with 2-ethyloctaldehyde, 2,3-dimethylbutyraldehyde, 2-methylheptaldehyde, 2-butylhexaldehyde, 2-butyloctaldehyde, 2-hexyloctaldehyde, diphenylacetaldehyde, 2-phenylpropionaldehyde, 3-methyl-2-phenylbutyraldehyde, and 2-phenyloctaldehyde, there were prepared 4-(2-ethyl-1-octenyl)morpholine, 4-(2,3-dimethyl-1-butenyl)morpholine, 4-(2 - methyl-1-heptenyl)morpholine, 4-(2-butyl - 1 - hexenyl)morpholine, 4 - (2-butyl-1-octenyl)morpholine, 4-(2-hexyl-1-octenyl)morpholine, 4-(2-phenylstyryl)morpholine, 4-(2 - phenylpropenyl)morpholine, 4-(3-methyl-2-phenyl-1-butenyl)morpholine, and 4-(2-phenyl-1-octenyl)morpholine, respectively.

PREPARATION 3

Following the procedure of Preparation 1, but replacing morpholine with diisopropylamine, diisobutylamine, dihexylamine, p-isopropyl-N-tert.pentylaniline, N-butyl-o-chloroaniline, N-methyl-m-toluidine, N-ethyl-3,5-xylidine, N,3-dimethylbutylamine, thiamorpholine, N-isopropylhexylamine, N-isopropyl-p-anisidine, N-ethylaniline, N-hexylaniline, and N-ethyl-2-methylpropylamine, there were prepared N,N-diisopropyl-(2-methylpropenyl)amine,
N-(2-methylpropenyl)diisobutylamine,
N-(2-methylpropenyl)dihexylamine,
p-isopropyl-N-(2-methylpropenyl)N-tert.pentylaniline,
N-butyl-o-chloro-N-(2-methylpropenyl)aniline,
N-methyl-N-(2-methylpropenyl)-m-toluidine,
N-ethyl-N-(2-methylpropenyl)-3,5-xylidine,
N,3-dimethyl-N-(2-methylpropenyl)butylamine,
4-(2-methylpropenyl)thiamorpholine,
N-isopropyl-N-(2-methylpropenyl)hexylamine,
N-isopropyl-N-(2-methylpropenyl)-p-anisidine,
N-ethyl-N-(2-methylpropenyl)aniline,
N-hexyl-N-(2-methylpropenyl)aniline, and
N-ethyl-2-methyl-N-(2-methylpropenyl)propylamine.

The following examples are illustrative of the process and products of the present invention, but are not to be construed as limiting.

EXAMPLE 1

*Preparation of 2,3-dihydro-3,3-dimethyl-2-(1-pyrrolidinyl)-naphtho[1,2-b]-furan-5-ol*

A solution of 15.8 g. (0.1 mole) 1,4-naphthoquinone and 12.5 g. (0.1 mole) 1-(2-methylpropenyl)pyrrolidine in 250 ml. of benzene was kept, for reaction, at about 25° C. After about 48 hrs., a solid that had separated was recovered on a filter. The filter cake was dissolved in hot ethyl acetate, the solution was treated with activated charcoal, and the charcoal was removed by filtration. The filtrate was allowed to cool to about 25° C. while crystallization proceeded. Crystallization was completed at about 4° C. in a refrigerator. The crystals of 2,3-dihydro-3,3-dimethyl-2-(1-pyrrolidinyl) - naphtho[1,2-b]furan-5-ol were recovered on a filter; yield, 19.2 g.; melting point 204° to 206° C. A sample recrystallized from ethyl acetate gave white crystals having a melting point of 205° to 208° C.

*Analysis.*—Calcd. for $C_{18}H_{21}NO_2$: C, 76.29; H, 7.47; N, 4.94. Found: C, 76.57; H, 7.70; N, 4.87.

EXAMPLE 2

*Preparation of 2,3-dihydro-3,3-dimethyl-2-piperidinonaphtho[1,2-b]furan-5-ol and the hydrochloride thereof*

A solution of 7.9 g. (0.05 mole) of 1,4-naphthoquinone and 7.0 g. (0.05 mole) of 1-(2-methylpropenyl)piperidine in 400 ml. of benzene was kept, for reaction, at about 25° C. After about 20 hrs. the benzene was removed by evaporation under reduced pressure. A red-black tar thus obtained was dissolved in ether, and the ether solution was treated with hydrogen chloride dissolved in ether. A tan solid that precipitated was suspended in hot isopropyl alcohol. After recovering the solid on a filter, it was recrystallized two times from a mixture of ethanol and ether. There was thus obtained 6.3 g. of 2,3-dihydro-3,3-dimethyl - 2 - piperidino-naphtho[1,2-b]furan-5-ol hydrochloride as a white solid having a melting point of 223° to 227° C. (decomposition). After one more recrystallization from the mixture of ethanol and ether and two recrystallizations from a mixture of methanol and ether, the compound had a melting point of 230° to 235° C. (decomposition).

*Analysis.*—Calcd. for $C_{19}H_{23}NO_2 \cdot HCl$: C, 68.35; H, 7.25; N, 4.20; Cl, 10.62. Found: C, 68.65; H, 7.38; N, 4.40; Cl, 10.79.

Following the same procedure, but substituting for hydrogen chloride other acids, e.g., hydrogen bromide, sulfuric, nitric, phosphoric, benzoic, p-toluenesulfonic, salicylic, acetic, propionic, pamoic, tartaric, citric, succinic, oxalic, and picric acids, there are obtained the hydrobromide, sulfate, nitrate, phosphate, benzoate, p-toluenesulfonate, salicylate, acetate, propionate, pamoate, tartrate, citrate, succinate, oxalate, and picrate of 2,3-dihydro-3,3-dimethyl-2-piperidino-naphtho[1,2-b]furan-5-ol.

EXAMPLE 3

Following the procedure of Example 2, but replacing 1-(2-methylpropenyl)piperidine with 1-(2-methylpropenyl)-morpholine,
1-(2-methylpropenyl)-4-methylpiperazine,
1-(2-methylpropenyl)hexamethylenimine,
1-(1-butenyl)piperidine,
1-styrylpiperidine,
1-(3-methyl-1-butenyl)piperidine,
4-(2-ethyl-1-octenyl)morpholine,
4-(2,3-dimethyl-1-butenyl)morpholine,
4-(2-methyl-1-heptenyl)morpholine,
4-(2-butyl-1-hexenyl)morpholine,
4-(2-butyl-1-octenyl)morpholine,
4-(2-hexyl-1-octenyl)morpholine,
4-(2-phenylstyryl)morpholine,
4-(2-phenylpropenyl)morpholine,
4-(3-methyl-2-phenyl-1-butenyl)morpholine,
4-(2-phenyl-1-octenyl)morpholine,
1-propenylpiperidine,
1-(1-heptenyl)piperidine,
N,N-diethyl-1-heptenylamine,
N-1-butenyl-N-methylaniline,
N,N-diethylstyrylamine,
1-propenylpyrrolidine,
N,N-diethyl-1-butenylamine,
1-(2-ethyl-1-butenyl)piperidine,
N,N-diethyl-2-methylpropenylamine,
4-(1-heptenyl)morpholine,
1-(2-ethyl-1-hexenyl)piperidine,
N,N,2-trimethylpropenylamine,
N,N-diisopropyl-(2-methylpropenyl)amine,
N-(2-methylpropenyl)diisobutylamine,
N-(2-methylpropenyl)dihexylamine,
p-isopropyl-N-(2-methylpropenyl)-N-tert.pentylaniline,
N-butyl-o-chloro-N-(2-methylpropenyl)aniline,
N-methyl-N-(2-methylpropenyl)-m-toluidine,
N-ethyl-N-(2-methylpropenyl)-3,5-xylidine,
N,3-dimethyl-N-(2-methylpropenyl)butylamine, 4-(2-methylpropenyl)thiamorpholine,
N-isopropyl-N-(2-methylpropenyl)hexylamine,
N-isopropyl-N-(2-methylpropenyl)-p-anisidine,
N-ethyl-N-(2-methylpropenyl)aniline,
N-hexyl-N-(2-methylpropenyl)aniline, and
N - ethyl - N - (2 - methylpropyl) - 2 - methylpropenyl-
amine, there were prepared 2,3-dihydro-3,3-dimethyl-2-morpholino-naphtho[1,2-b]furan-5-ol,
2,3-dihydro-3,3-dimethyl-2-(4-methyl-1-piperazinyl)-naphtho[1,2-b]furan-5-ol,
2,3-dihydro-3,3-dimethyl-2-(hexahydro-1H-azepin-1-yl)-naphtho[1,2-b]furan-5-ol,
2,3-dihydro-3-ethyl-2-piperidino-naphtho[1,2-b]furan-5-ol,
2,3-dihydro-3-phenyl-2-piperidino-naphtho[1,2-b]furan-5-ol,
2,3-dihydro-3-ethyl-3-hexyl-2-morpholino-naphtho[1,2-b]furan-5-ol,
2,3-dihydro-2-methyl-3-isopropyl-2-morpholino-naphtho[1,2-b]furan-5-ol,
2,3-dihydro-3-methyl-3-pentyl-2-morpholino-naphtho[1,2-b]furan-5-ol,
2,3-dihydro-3,3-dibutyl-2-morpholino-naphtho[1,2-b]furan-5-ol,
2,3-dihydro-3-butyl-3-hexyl-2-morpholino-naphtho[1,2-b]furan-5-ol,
2,3-dihydro-3,3-dihexyl-2-morpholino-naphtho[1,2-b]furan-5-ol,
2,3-dihydro-3,3-diphenyl-2-morpholino-naphtho[1,2-b]furan-5-ol,
2,3-dihydro-3-methyl-3-phenyl-2-morpholino-naphtho[1,2-b]furan-5-ol,
2,3-dihydro-3-isopropyl-3-phenyl-2-morpholino-naphtho[1,2-b]furan-5-ol,
2,3-dihydro-3-hexyl-3-phenyl-2-morpholino-naphtho[1,2-b]furan-5-ol,
2,3-dihydro-3-methyl-2-piperidino-naphtho[1,2-b]furan-5-ol,
2,3-dihydro-3-pentyl-2-piperidino-naphtho[1,2-b]furan-5-ol,
2,3-dihydro-3-pentyl-2-diethylamino-naphtho[1,2-b]furan-5-ol,
2,3-dihydro-3-ethyl-2-(N-methylanilino)-naphtho[1,2-b]furan-5-ol,
2,3-dihydro-3-phenyl-2-diethylamino-naphtho[1,2-b]furan-5-ol,
2,3-dihydro-3-methyl-2-(1-pyrrolidinyl)-naphtho[1,2-b]furan-5-ol,
2,3-dihydro-3-ethyl-2-diethylamino-naphtho[1,2-b]furan-5-ol,
2,3-dihydro-3,3-dimethyl-2-diethylamino-naphtho[1,2-b]furan-5-ol,
2,3-dihydro-3,3-diethyl-2-piperidino-naphtho[1,2-b]furan-5-ol,
2,3-dihydro-3-pentyl-2-morpholino-naphtho[1,2-b]furan-5-ol,
2,3-dihydro-3-butyl-3-ethyl-2-piperidino-naphtho[1,2-b]furan-5-ol,
2,3-dihydro-3,3-dimethyl-2-dimethylamino-naphtho[1,2-b]furan-5-ol,
2,3-dihydro-3,3-dimethyl-2-diisopropylamino-naphtho[1,2-b]furan-5-ol,
2,3-dihydro-3,3-dimethyl-2-dihexylamino-naphtho[1,2-b]furan-5-ol,
2,3-dihydro-3,3-dimethyl-2-diisobutylamino-naphtho[1,2-b]furan-5-ol,
2,3-dihydro-3,3-dimethyl-2-(p-isopropyl-N-tert.pentylanilino)-naphtho[1,2-b]furan-5-ol,
2,3-dihydro-3,3-dimethyl-2-(o-chloro-N-butylanilino)-naphtho[1,2-b]furan-5-ol,
2,3-dihydro-3,3-dimethyl-2-(N-methyl-m-toluidino)-naphtho[1,2-b]furan-5-ol,
2,3-dihydro-3,3-dimethyl-2-(N-methyl-3,5-xylidino)-naphtho[1,2-b]furan-5-ol,
2,3-dihydro-3,3-dimethyl-2-(N,3-dimethylbutylamino)-naphtho[1,2-b]furan-5-ol,
2,3-dihydro-3,3-dimethyl-2-thiamorpholino-naphtho[1,2-b]furan-5-ol,
2,3-dihydro-3,3-dimethyl-2-(N-isopropylhexylamino)-naphtho[1,2-b]furan-5-ol,
2,3-dihydro-3,3-dimethyl-2-(N-isopropyl-p-anisidino)-naphtho[1,2-b]furan-5-ol,
2,3-dihydro-3,3-dimethyl-2-(N-ethylanilino)-naphtho[1,2-b]furan-5-ol,
2,3-dihydro-3,3-dimethyl-2-(N-hexylanilino)-naphtho[1,2-b]furan-5-ol, and
2,3-dihydro-3,3-dimethyl-2-(N-ethyl-2-methylpropylamino)-naphtho[1,2-b]furan-5-ol, respectively.

EXAMPLE 4

*Preparation of 2,3-dihydro-3,3-dimethyl-2-(1-pyrrolidinyl)-naphtho[1,2-b]furan-5-ol acetate*

A solution consisting of 2 g. of 2,3-dihydro-3,3-dimethyl - 2 - (1 - pyrrolidinyl) - naphtho[1,2-b]furan - 5 - ol (Example 1) in 30 ml. of acetic anhydride was heated at the reflux temperature for 1 hr., and the reaction mixture was poured into ice-water. After standing for several hours, the aqueous mixture was basified with aqueous sodium carbonate solution and extracted with methylene chloride. The organic layer was separated, washed with water, dried, and concentrated under reduced pressure. The white solid thus obtained was recrystallized two times from a mixture of ether and technical hexane to give 2,3 - dihydro - 3,3 - dimethyl - 2 - (1 - pyrrolidinyl)-naphtho[1,2-b]furan-5-ol acetate.

Following the same procedure, but substituting propionic anhydride, butyric anhydride, valeric anhydride, acetic formic anhydride, and caproic anhydride for acetic anhydride, there were prepared 2,3-dihydro-3,3-dimethyl-2-(1-pyrrolidinyl)-naphtho-[1,2-b]furan-5-ol propionate,
2,3-dihydro-3,3-dimethyl-2-(1-pyrrolidinyl)-naphtho-[1,2-b]furan-5-ol butyrate,
2,3-dihydro-3,3-dimethyl-2-(1-pyrrolidinyl)-naphtho-[1,2-b]furan-5-ol valerate,
2,3-dihydro-3,3-dimethyl-2-(1-pyrrolidinyl)-naphtho-[1,2-b]furan-5-ol formate, and
2,3-dihydro-3,3-dimethyl-2-(1-pyrrolidinyl)naphtho-[1,2-b]furan-5-ol caproate, respectively.

I claim:
1. A compound selected from the group consisting of (1) 2-amino-2,3-dihydro-3-substituted - naphtho[1,2-b]furan-5-ol of the formula:

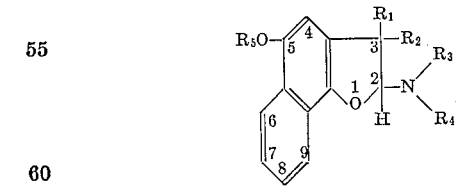

wherein $R_5$ is selected from the group consisting of hydrogen and lower-alkanoyl; $R_1$ is selected from the group consisting of hydrogen, lower-alkyl, and phenyl; $R_2$ is selected from the group consisting of lower-alkyl and phenyl; $R_3$ and $R_4$ taken separately are selected from the group consisting of lower-alkyl, phenyl, and substituted phenyl selected from the group consisting of lower-alkylphenyl, lower-alkoxyphenyl, and halophenyl, provided that $R_3$ and $R_4$ are not simultaneously selected from phenyl and substituted phenyl; and $R_3$ and $R_4$ taken together with —N< constitute a saturated heterocyclic amino radical selected from the group consisting of pyrrolidinyl, 2-methlypyrrolidinyl, 2-ethylpyrrolidinyl, 2,2-dimethylpyrrolidinyl, 3,4-dimethylpyrrolidinyl, 2-isopropylpyrrolidinyl, 2-sec.butylpyrrolidinyl, and like lower-alkylpyrrolidinyl groups, morpholino, 2-ethylmorpholino, 2-ethyl-5-methylmorpholino, 3,3 - dimethylmorpholino, thiamorpholino, 3-methylmorpholino, 2,3,6 - trimethylmorpholino, 4 - methylpiperazinyl, 4 - butylpiperazinyl, piperidino, 2-methylpiperidino, 3-methylpiperidino, 4-methylpiperidino, 4-propylpiperidino, 2-propylpiperidino, 4-isopropylpiperidino, and like lower - alkylpiperidino groups hexamethylenimino, 2-methylhexamethylenimino, 3,6-dimethylhexamethylenimino, and homomorpholino; and (2) acid addition salts thereof.

2. An acid addition salt of 2,3-dihydro-3,3-di-lower-alkyl-2-piperidino-naphtho[1,2-b]furan-5-ol.

3. An acid addition salt of 2,3-dihydro-3,3-dimethyl-2-piperidino-naphtho[1,2-b]furan-5-ol.

4. 2,3-dihydro-3,3 - dimethyl - 2 - piperidino-naphtho[1,2-b]furan-5-ol hydrochloride.

5. 2,3 - dihydro-3,3-dimethyl-2-(1-pyrrolidinyl)-naphtho[1,2-b]furan-5-ol.

References Cited

UNITED STATES PATENTS

| 2,421,812 | 6/1947 | Smith et al. | 260—346.2 |
| 3,184,457 | 5/1965 | Brannock et al. | 260—294.7 |

OTHER REFERENCES

Ingham et al.: Chem. Abst., vol. 25:3339[9] and 3340[1] (1931).

JOHN D. RANDOLPH, *Primary Examiner.*

A. D. SPEVACK, *Assistant Examiner.*